(12) United States Patent
Chartier et al.

(10) Patent No.: US 10,352,242 B2
(45) Date of Patent: Jul. 16, 2019

(54) VENTILATION OF A TURBOMACHINE NACELLE

(71) Applicant: SNECMA, Paris (FR)

(72) Inventors: Sarah Chartier, Moissy-Cramayel (FR); Jean-Christophe Duffet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 695 days.

(21) Appl. No.: 14/898,980

(22) PCT Filed: Jun. 13, 2014

(86) PCT No.: PCT/FR2014/051461
§ 371 (c)(1),
(2) Date: Dec. 16, 2015

(87) PCT Pub. No.: WO2014/202881
PCT Pub. Date: Dec. 24, 2014

(65) Prior Publication Data
US 2016/0138472 A1 May 19, 2016

(30) Foreign Application Priority Data

Jun. 18, 2013 (FR) ...................... 13 55748

(51) Int. Cl.
*F02C 6/08* (2006.01)
*F02C 7/18* (2006.01)
(Continued)

(52) U.S. Cl.
CPC ............... *F02C 7/18* (2013.01); *B64D 29/00* (2013.01); *B64D 33/08* (2013.01); *F01D 25/24* (2013.01);
(Continued)

(58) Field of Classification Search
CPC .... F01D 25/14; F01D 25/24; F05D 2220/324; F05D 2220/325; F05D 2260/601;
(Continued)

(56) References Cited

U.S. PATENT DOCUMENTS 3,255,708 A * 6/1966 Williams ................ F04F 5/466
261/DIG. 75
4,351,150 A * 9/1982 Schulze ................ F01D 17/085
60/226.1
(Continued)

FOREIGN PATENT DOCUMENTS

DE 859 983 C 12/1952
DE 196 39 623 A1 4/1998
(Continued)

OTHER PUBLICATIONS

International Search Report dated Sep. 12, 2014, issued in corresponding International Application No. PCT/FR2014/051461, filed Jun. 13, 2014, 3 pages.
(Continued)

*Primary Examiner* — Christopher Verdier
(74) *Attorney, Agent, or Firm* — Christensen O'Connor Johnson Kindness PLLC

(57) ABSTRACT

A jet pump type ejector for a turbomachine, including a duct through which a secondary ventilation air flow passes, and a first end of which forms an air intake and a second end of which forms an air outlet, the two nozzles for spraying a primary air flow being mounted in the duct which defines a mixer and a diffuser downstream from the nozzle, the two nozzles being parallel and adjacent to one another, the mixer including two substantially planar longitudinal walls, bottom and top respectively, connected to one another by two side walls having a semicircular cross-section, in which the radius of curvature R2 is centered on the axis of a nozzle, the
(Continued)

center-to-center distance of the nozzles being substantially equal to Π/2 times R2 or (Π/2)R2.

10 Claims, 2 Drawing Sheets

(51) Int. Cl.
| | | |
|---|---|---|
| *F04F 5/20* | (2006.01) | |
| *F04F 5/46* | (2006.01) | |
| *B64D 29/00* | (2006.01) | |
| *B64D 33/08* | (2006.01) | |
| *F01D 25/24* | (2006.01) | |

(52) U.S. Cl.
CPC .................. *F02C 6/08* (2013.01); *F04F 5/20* (2013.01); *F04F 5/463* (2013.01); *F04F 5/466* (2013.01); *F05D 2220/324* (2013.01); *F05D 2220/325* (2013.01); *F05D 2260/601* (2013.01); *F05D 2260/605* (2013.01); *F05D 2260/608* (2013.01)

(58) Field of Classification Search
CPC ......... F05D 2260/605; F05D 2260/608; B64D 29/00; B64D 29/06; B64D 33/08; B64D 35/06; B64D 2027/005; F02C 6/08; F02C 9/18; F02C 7/18; F04F 5/00; F04F 5/14; F04F 5/16; F04F 5/20; F04F 5/46; F04F 5/466; F04F 5/463
USPC .................................................. 417/196, 198
See application file for complete search history.

(56) References Cited

U.S. PATENT DOCUMENTS

| | | | |
|---|---|---|---|
| 5,058,704 | A | 10/1991 | Yu |
| 6,877,960 | B1* | 4/2005 | Presz, Jr. .................. F04F 5/46 417/183 |
| 8,430,202 | B1 | 4/2013 | Mason |
| 2008/0296439 | A1* | 12/2008 | Cloft ...................... B64D 33/02 244/208 |
| 2010/0107616 | A1 | 5/2010 | Janakiraman |
| 2011/0138819 | A1* | 6/2011 | Tanimura ................ F01D 25/30 60/796 |
| 2012/0195739 | A1* | 8/2012 | Kingan .................... B64C 7/02 415/119 |
| 2012/0287744 | A1 | 11/2012 | Pollard |

FOREIGN PATENT DOCUMENTS

| | | |
|---|---|---|
| EP | 0 541 346 A1 | 5/1993 |
| FR | 2 343 891 A1 | 10/1977 |

OTHER PUBLICATIONS

Written Opinion of the International Searching Authority dated Sep. 12, 2014, issued in corresponding International Application No. PCT/FR2014/051461, filed Jun. 13, 2014, 7 pages.

International Preliminary Report on Patentability dated Dec. 22, 2015, issued in corresponding International Application No. PCT/FR2014/051461, filed Jun. 13, 2014, 1 page.

* cited by examiner

VENTILATION OF A TURBOMACHINE NACELLE

TECHNICAL FIELD

Embodiments of the present disclosure relate to a turbine engine nacelle comprising ventilation means and to a turbine engine comprising such a nacelle.

PRIOR ART

It is important for the thermal environment of a turbine engine nacelle to be controlled so that in particular the equipment accommodated in the nacelle is not subjected to overly high temperatures, which could reduce the service life thereof. A plurality of heat sources in the turbine engine (housing lines, lubrication equipment, etc.) can in fact increase the surrounding temperature in the nacelle.

When the turbine engine is a turboprop engine, the compressed air supplied by the upstream propeller makes it possible to ventilate the outer surface of the nacelle, even when the Mach number of the aircraft equipped with the turboprop engine is very low or even zero (for example when the aircraft is on the ground). The nacelle of the turboprop engine can further be equipped with a scoop which is placed downstream of the propeller and is intended to collect compressed air and transport it inside the nacelle for the purpose of the ventilation thereof.

In the case of a turboprop engine having two unducted and contra-rotating propellers (of the open-rotor type), the propellers can be located downstream of the engine. The nacelle of the turboprop engine can also be equipped with a scoop of the above-mentioned type, to ensure that the dynamic pressure in flight is recovered. However, on the ground, the pressure difference between the scoop and a downstream end of the nacelle is zero, and the nacelle is not ventilated. It is therefore necessary to find a solution for ventilating a nacelle of this type of turbine engine for a low Mach number or a Mach number of zero.

The aim of the present disclosure is in particular to provide a simple, effective and economical solution to this problem which is adapted in particular but not exclusively to a turbine engine of the open-rotor type.

SUMMARY

Embodiments of the disclosure propose an ejector of the jet pump type for a turbine engine, comprising a duct for the passage of a secondary ventilation air flow, a first end of which forms an air input and a second end of which forms an air output, wherein two nozzles for spraying a primary air flow are mounted in the duct which defines a mixer and a diffuser downstream of the nozzle, the two nozzles being parallel and next to one another, and in that the mixer comprises two substantially planar longitudinal walls, lower and upper respectively, which are interconnected by two side walls having a semi-circular cross section, and the bending radius R2 of which is centered on the axis of a nozzle, the center-to-center distance of the nozzles being equal to $\pi/2 \cdot R2$.

The operation of an ejector of the jet pump type is well known to a person skilled in the art and is based on the principle of the Venturi effect. The ejector comprises a primary circuit comprising a nozzle for generating a jet of pressurized primary fluid inside a duct of a secondary circuit. The duct has an input and an output of secondary fluid and defines a mixer and a diffuser downstream of the nozzle. The primary fluid which is ejected into the duct expands in the diffuser, creating a negative pressure and forcing the passage of secondary fluid from the input as far as the output of the duct, the secondary fluid then being mixed with the primary fluid in the duct.

In the present disclosure, the primary and secondary fluids are air. The air input of the duct opens into the nacelle so that the air contained in the nacelle is sucked into and circulates in the duct as far as the output thereof, this phenomenon leading to movements of air in the nacelle, ensuring the ventilation thereof, even when the aircraft equipped with a turbine engine having a nacelle according to the disclosure is on the ground.

According to a preferred embodiment of the disclosure, the or each ejector comprises two spray nozzles which are parallel and are mounted next to one another.

Some constraints, such as protecting the nacelle when the duct of an ejector bursts, involve providing a relatively large output portion for the duct. During the installation of ejectors in a nacelle, the output portion is used by the ejectors themselves, but also for the passive ventilation of the nacelle when the ejectors are not operating. The constraints make it necessary to oversize the ejectors, and this poses problems in terms of bulk and thus in terms of installation in the nacelle. Equipping the or each ejector with two spray nozzles makes it possible to reduce the bulk thereof whilst making it possible to preserve the yield thereof, as will be explained in greater detail below. The yield of an ejector is linked in particular to the length of the portion of the duct in which the mixing of the primary and secondary fluids (air) takes place, the length preferably being at least five times the diameter or the transverse dimension of the mixer of the duct. The present disclosure makes it possible in particular to reduce the length of the ejector for a constant output cross section.

In this case, the mixer of the duct comprises two substantially planar longitudinal walls, lower and upper respectively, which are interconnected by two side walls having a semi-circular cross section, and the bending radius of which is centered on the axis of a nozzle.

The overall flow cross section defined by the mixer of the duct is preferably constant and symmetrical with respect to a longitudinal median plane. Thus, the diameter of the mixing region does not increase and it is possible to preserve a sufficient diameter:length ratio of the mixer. In addition, the ejector having a double nozzle is symmetrical, and this also makes it possible to ensure that a high yield is preserved.

The center-to-center distance of the nozzles is advantageously equal to $\pi/2 \cdot R2$, R2 being the above-mentioned bending radius. This makes it possible to keep the same flow cross section as with a single nozzle through an ejector.

The ejector preferably has a length of between 10R2 and 16R2.

Advantageously, the longitudinal walls are substantially parallel and have substantially the same dimensions.

The disclosure further relates to a ventilation or pressurization system for a turbine engine, comprising at least one ejector of the type described above.

The disclosure also relates to a turbine engine nacelle comprising at least one ejector of the type described above.

The disclosure thus proposes ventilating the nacelle of a turbine engine by means of one or more ejectors or jet pumps. FR-A1-2 961 856 by the applicant describes a jet pump for a turbine engine. It is thus already known to use this type of ejector in a turbine engine. However, in the present disclosure, this ejector is used to ensure ventilation of the nacelle of the turbine engine, which is not the case in the above-mentioned document, in which the jet pump is used to remove the gas from a lubrication chamber of the engine of the turbine engine.

The first end of the duct can form an air input which is located in the nacelle. The second end of the duct can open onto an outer surface of the nacelle so that the air leaving the duct is expelled to the outside of the turbine engine.

The nacelle can comprise an annular array of ejectors which are distributed regularly around the longitudinal axis of the nacelle. There are for example four, eight or sixteen of the ejectors.

The present disclosure also relates to a turbine engine, such as a turbojet or a turboprop engine of an aeroplane, comprising a nacelle of the above-mentioned type, the spray nozzles being supplied with compressed air which is bled from a compressor of the turbine engine.

The turbine engine can be a turboprop engine having two unducted and contra-rotating propellers.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1:
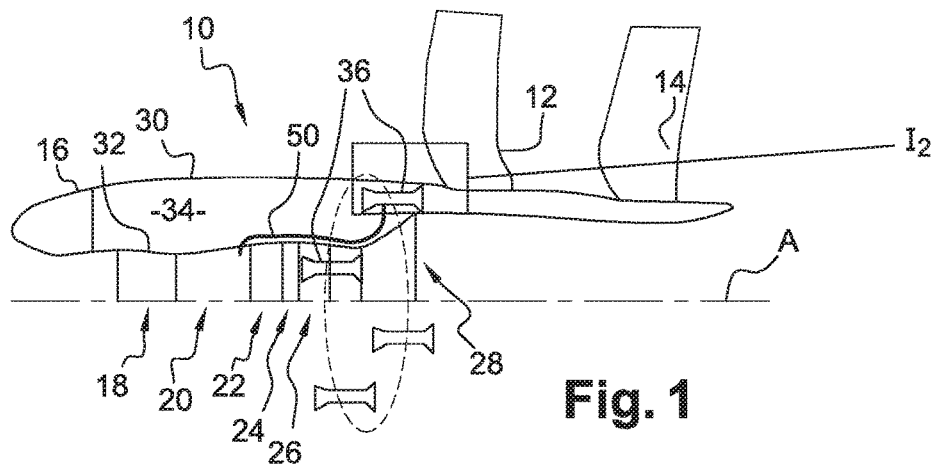
FIG. 1 is a schematic, axial sectional half view of a turbine engine of the open-rotor type according to the disclosure.
Figure 2:
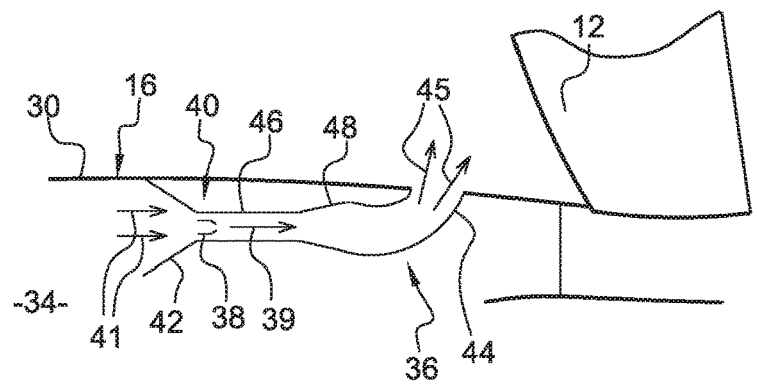
FIG. 2 is a larger-scale view of the detail $I_2$ from FIG. 1.

Reference is firstly made to FIGS. 1 and 2 which show an aircraft turbine engine 10, the turbine engine 10 being a turboprop engine or open rotor and comprising downstream two unducted and contra-rotating propellers 12, 14.

The turbine engine 10 comprises an engine surrounded by a nacelle 16, the engine comprising, from upstream to downstream, in the direction of flow of the gases, a low-pressure compressor 18, a high-pressure compressor 20, a combustion chamber 22, a high-pressure turbine 24, a low-pressure turbine 26 and a power turbine 28 for driving the propellers 12, 14.

The nacelle 16 has an annular shape and comprises an outer annular wall 30 which extends around the housings 32 of the engine and which defines with the housings an annular space 34 in which equipment of the turbine engine is accommodated. The equipment has to be ventilated during the operation of the engine.

The present disclosure proposes ventilating the nacelle 16 by means of ejectors 36 of the jet pump type which are mounted in the above-mentioned space 34. In the example shown in FIG. 1, the nacelle 16 is equipped with four ejectors 36 which are distributed regularly around the longitudinal axis A of the turbine engine.

An ejector 36 comprises a primary circuit comprising at least one nozzle 38 for spraying a primary air flow (arrow 39—FIG. 2) inside a duct 40 of a secondary circuit. The duct 40 defines a flow path for the passage of a secondary air flow (arrow 41) and comprises an air input 42 which opens into the space 34 in the nacelle 16 and an air output 44 which opens onto the outer surface of the wall 30 for evacuating the air to the outside of the turbine engine (arrows 45).

The duct 40 has an elongate shape and defines, downstream of the nozzle 38, a mixer 46 and a diffuser 48, the mixer having a constant flow cross section, whereas the diffuser diverges downstream and thus has a flow cross section which increases downstream.

The primary air flow ejected by the nozzle 38 expands in the diffuser 48, which creates a negative pressure and forces the passage of the secondary air flow from the input 42 as far as the output 44 of the duct, the air of the secondary fluid coming from the space 34, which induces movements and flows of air inside the nacelle 16 and ensures the ventilation thereof.

In the present case, the pressurized air ejected by the nozzle 38 is compressed air bled from the high-pressure compressor 20 of the engine, and transported as far as the nozzle by means of an air channel 50 which is shown schematically in FIG. 1.

Figure 3:
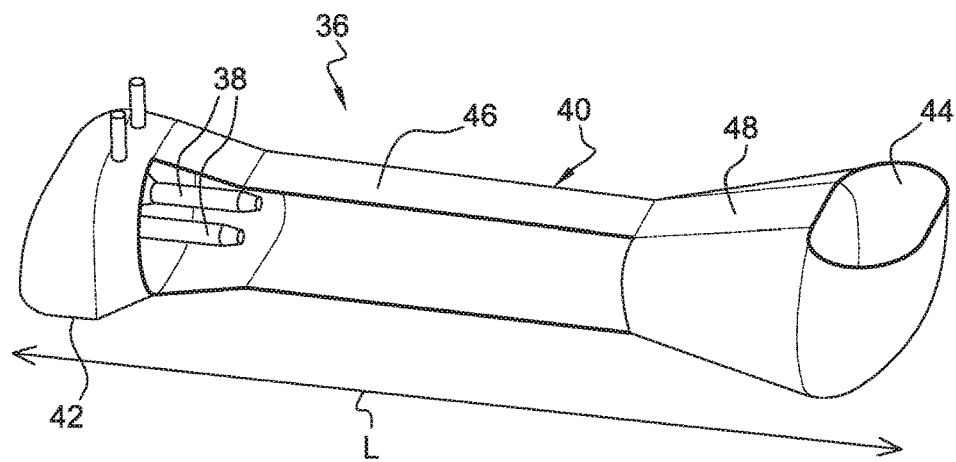
FIG. 3 is a schematic perspective view of an ejector of the nacelle according to the disclosure.

The air input 42 of the duct 40 can open radially towards the inside and the air output 44 thereof can open radially towards the outside, with respect to the longitudinal axis A, as shown in FIG. 3.

FIG. 3 shows a preferred embodiment of an ejector 36 according to the disclosure, the ejector being equipped with two parallel and adjacent nozzles 38. As will be explained below, mounting two nozzles 38 in the duct 40 makes it possible to reduce the axial length L and thus the axial bulk of the ejector 36, the length being in particular dependent on the diameter or the transverse dimension of the flow cross section of the mixer 46 of the duct 40 (the length L is preferably at least five times the diameter).

Figure 4:
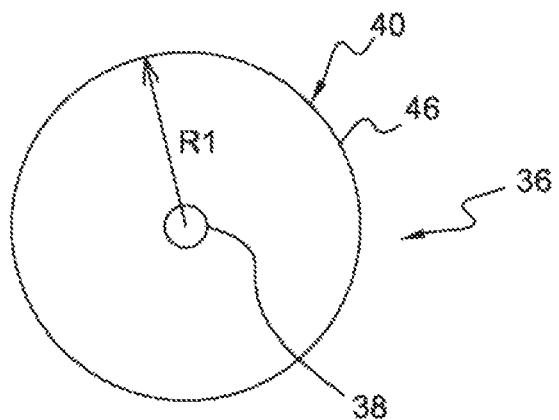
FIG. 4 is a very schematic view of the flow cross-section of a mixer of an ejector duct equipped with a single spray nozzle.

FIG. 4 schematically shows the mixer 46 of a duct 40 of an ejector 36 equipped with a single spray nozzle 38. In this case, the mixer 46 has a cylindrical general shape and defines a circular flow cross section, the radius R1 of which is centered on the axis of the nozzle 38. This ejector must thus have a length $L=10 \cdot R1$.

Figure 5:
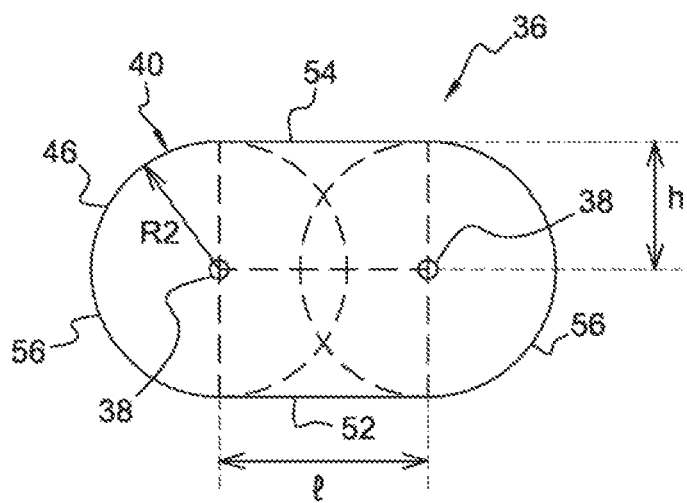
FIG. 5 is a very schematic view of the flow cross-section of a mixer of an ejector duct equipped with two spray nozzles.

FIG. 5 schematically shows the mixer 46 of a duct 40 of an ejector 36 equipped with two nozzles 38, as is the case in FIG. 3. The mixer 46 has a non-circular cross section. The mixer 46 comprises two planar longitudinal walls, lower 52 and upper 54 respectively, which are interconnected by curved side walls 56.

The center-to-center distance 38 is marked I. Each of the walls 52 and 54 has a width which is substantially equal to this center-to-center distance I. The side walls 56 each have a semi-circular cross section which extends around a nozzle 38, and the bending radius R2 of which is centered on the nozzle. The half-height h of the flow cross section, which corresponds to the distance between the axis of a nozzle 38 and one of the walls 52, 54, is equal to R2.

To reduce the axial bulk of the ejectors 36, the ejector from FIGS. 3 and 5 has to be dimensioned so that the passage surface defined by the mixer 46 thereof is equal to that of the ejector from FIG. 4. The flow cross section shown in FIG. 5 (which is equal to the area of two semicircles having a radius R2 or h, plus the area of the rectangle having a length 2R2 or 2h and a width l) must thus be equal to the combined flow cross sections of the mixers in the case in which the nozzles are mounted in two distinct ejectors (which are equal to two times $\pi \cdot R2^2$ or $\pi \cdot h^2$. The equation $2 \cdot \pi \cdot h^2 = \pi \cdot h^2 + 2 \cdot h \cdot l$ is thus obtained, and this makes it possible to deduce that the center-to-center distance $l=\pi/2 \cdot h$. $2 \cdot \pi \cdot h^2 = \pi \cdot h^2 + 2 \cdot h \cdot l$ gives $2 \cdot h \cdot l = 2 \cdot \pi \cdot h^2 - \pi \cdot h^2 = \pi \cdot h^2$ and therefore $l = \pi \cdot h^2/2 \cdot h = \pi/2 \cdot h$. Furthermore, it is desired for $\pi \cdot R1^2$ to $=2 \cdot \pi \cdot R2^2$, i.e. for $R1^2$ to $=2 \cdot R2^2$. R1 must thus $=R2 \cdot \sqrt{2}$. The required length is $5 \cdot D \leq Li \leq 8 \cdot D$ or $10 \cdot Ri \leq Li \leq 16 \cdot Ri$ where i=(1 or 2). The ratio of the lengths L1:L2 is thus 10·R1: 10·R2 or 16·R1:16·R2, i.e. $10 \cdot R2 \cdot \sqrt{2}$:10·R2 or $16 \cdot R2 \sqrt{2}$:16·R2, or else $\sqrt{2}$, or approximately 1.4. The ejector from FIGS. 3 and 5 is thus 1.4 times shorter than that from FIG. 4, which represents a specific gain in terms of installation. In the same way, the cross section of the primary circuit has to be kept constant, to the extent that the two nozzles 38 of the ejector from FIGS. 3 and 5 each have a radius which is 1.4 times smaller than that of the nozzle of the ejector from FIG. 3.

The invention claimed is:

1. An ejector of a jet pump type for a turbine engine, comprising a duct configured for a passage of a secondary ventilation air flow, a first end of said duct forming an air input and a second end of said duct forming an air output wherein two nozzles configured for spraying a primary air flow are mounted in the duct which defines a mixer and a diffuser downstream of the two nozzles, said two nozzles being parallel and next to one another, and wherein the mixer comprises two substantially planar longitudinal walls, lower and upper respectively, which are interconnected by two side walls having a semi-circular cross section and a bending radius R2, the bending radius R2 of each side wall being centered on an axis of one nozzle, a center-to-center distance of the two nozzles being substantially equal to $(\pi/2) \times R2$.

2. The ejector according to claim 1 which has a length of between 10R2 and 16R2.

3. The ejector according to claim 1, wherein the longitudinal walls are substantially parallel and have substantially the same dimensions.

4. A ventilation or pressurization system for the turbine engine which comprises at least one ejector according to claim 1.

5. A turbine engine nacelle which comprises at least one ejector according to claim 1.

6. The turbine engine nacelle according to claim 5, wherein said first end of the duct forms the air input which is located in the turbine engine nacelle.

7. The turbine engine nacelle according to claim 5, wherein the second end of the duct opens onto an outer surface of the turbine engine nacelle which is suitable for expelling air leaving the duct to the outside of the turbine engine.

8. The turbine engine nacelle according to claim 5, which comprises an annular array of ejectors which are regularly distributed around a longitudinal axis of the turbine engine nacelle.

9. A turbine engine which comprises the turbine engine nacelle according to claim 5, the nozzles being supplied with compressed air which is bled from a compressor of the turbine engine.

10. The turbine engine according to claim 9, which is a turboprop engine having two unducted and contra-rotating propellers.

* * * * *